United States Patent

[11] 3,622,600

[72] Inventor Jack Bernard Feder
Dumont, N.J.
[21] Appl. No. 801,835
[22] Filed Feb. 24, 1969
[45] Patented Nov. 23, 1971
[73] Assignee Halcon International Inc.

[54] METHOD FOR PREPARING COLOR STABLE MALEIC ANHYDRIDE
6 Claims, No Drawings

[52] U.S. Cl. ........................................... 260/346.8
[51] Int. Cl. .......................................... C07c 57/14
[50] Field of Search ........................................... 260/346.8

[56] References Cited
UNITED STATES PATENTS
3,115,503  12/1963  Bownen ........................ 260/346.8

Primary Examiner—Alex Mazel
Assistant Examiner—Bernard F. Dentz
Attorneys—William C. Long and David Dick ABSTRACT: This invention relates to a method for preparing color stable maleic anhydride by passing molten maleic anhydride through a bed of alkali sulfates or halides.

METHOD FOR PREPARING COLOR STABLE MALEIC ANHYDRIDE

This invention relates to a method for preparing color stable maleic anhydride.

In particular this invention relates to a method for preparing color stable maleic anhydride by passing molten maleic anhydride through a bed containing an alkali or alkali earth chloride, sulfate, bromide, barium nitrate or silver chloride or mixtures containing two or more of said compounds.

Maleic anhydride is produced commercially from several principle sources such as by the vapor phase oxidation of organic compounds such as benzene, naphthenes, butene-1 and the like. While maleic anhydride so prepared can be purified by techniques known to the art to provide essentially white maleic anhydride, it is known that upon prolonged standing this anhydride has a tendency to discolor. Further, the rate of discoloration is even more pronounced when the solid maleic anhydride is maintained in its molten form.

The darkening of maleic anhydride upon standing and/or heating presents problems in its commercial utilization where the color of maleic anhydride is important. Such is the case in the paint industry for example, wherein maleic anhydride is used in the preparation of some paints. Therefore, there is a need in the industry for maleic anhydride which does not discolor to any great extent and preferably remains white or essentially retains its color, both upon standing as well as upon heating.

It is, therefore, an object of this invention to provide a method by which maleic anhydride can be made color stable, particularly upon standing at room temperature or higher for a period of time, and which does not discolor to the same extent as a similar maleic anhydride which has not been treated by the method of this invention. Still another object is to provide a method by which maleic anhydride which is derived from benzene, naphthene or butene-1 1 is made color stable. Other objects of this invention will become clear upon reading the specification.

DETAILS OF THE INVENTION

It has been found that the objects of this invention are accomplished by passing molten refined maleic anhydride through a bed of silver chloride, barium nitrate or alkali or alkali earth sulfates, chlorides or bromides. The molten maleic anhydride is continuously passed through said bed, for a time which is sufficient to effect an improvement in the effluent maleic anhydride with regard to its color stability.

The source of crude or commercial maleic anhydride which is treated by the method of this invention has little or no effect upon the ability of the method to render maleic anhydride, color stable. Therefore, this invention is applicable to the use of maleic anhydride when prepared by any of the commercially available methods. However, the invention is particularly applicable wherein the maleic anhydride has been prepared by the vapor phase oxidation of benzene or from butene. For example, the maleic anhydride employed in this invention may be readily prepared from the procedures as described in U.S. Pats. Nos. 2,967,185 and 2,777,860.

In accordance with this invention, the maleic anhydride to be treated is obtained from distilled or normally commercially available maleic anhydride. In the preferred embodiment of this invention, the maleic anhydride is a purified or commercial maleic anhydride which has been obtained from the vapor phase oxidation of benzene of butene. In its broadest aspect, the maleic anhydride is passed through a body of alkali or alkali earth chloride, sulfate, bromide, barium nitrate, silver chloride or mixtures thereof. In the preferred aspects, of this invention calcium chloride, barium chloride, barium nitrate or sodium chloride is used, and especially barium chloride.

The maleic anhydride (hereinafter referred to as M.A.) is passed through a bed of the above mentioned material, while in a molten state. The temperature at which the molten M.A. is treated is not critical. Accordingly, temperatures may be from the melting point to the boiling point of M.A. (52° to 198° C.), desirably from 52° to 190° C. and preferably from 60° to 100° C. The M.A. may suitably be passed through a tower (or any other solid-liquid contactor) filled with solid treating agent at a liquid space velocity (LHSV) of from 0.1 to 100 (lb. M.A./hr.)/(lb. of treating agent in the tower), but preferably from 1 to 10. The particle size of the solid treating agent is not critical, accordingly may be 0.001 to 100 mm. but preferably 0.1 to 10 mm. and especially 0.3 to 3 mm.

The M.A. is passed continuously through the bed of solid treating agent, such that the effluent M.A. when tested for its color stability shows a marked improvement over the untreated M.A.

The treated M.A. as well as the untreated M.A. is tested for its color stability after a heat test by the well known A.S.T.M. method. For example, when the treated M.A. is maintained at a temperature of 137°–143° C. for 24 hours in apparatus specified in A.S.T.M. procedure No. D2280–66, its color is considerably lighter than a similar, untreated, maleic anhydride which has also been so heated. It has been found in some cases that when an untreated maleic anhydride is heated as described above, it has a Platinum-Cobalt color of between 100 and 150, or more, as measured by the well known A.S.T.M. method, whereas when the similar, but treated maleic anhydride has been heat tested as above, Platinum-Cobalt color of approximately 80 is obtained. It has been specifically found that the M.A. treated by the method of this invention, after heat test, has a Platinum-Cobalt color much less than the same maleic anhydride which has not been treated, but which has been subjected to the same test. For the purposes of this invention a color stable M.A. is one which has been treated by the method of this invention and which has a Platinum-Cobalt color of less than 100 and preferably less than 80 after being subjected to the heat treatment test as described above, in contrast to a similar M.A. which without being treated by the method of this invention has a Platinum-Cobalt color of over 100 and more particularly over 125.

The following examples are given by way of illustration:

EXAMPLE I

A stainless steel tube of 0.62-inch inside diameter is packed to a height of 4 inches with $BaCl_2 \cdot 2H_2O$ crystals, (crystal size 0.3 to 0.5 mm.). Molten maleic anhydride at 60° C. is pumped upward through this packed tube at the rate of 1000 ml./hr. (1330 g./hr.) for a period of 3 hours. The first hour of flow is rejected as "forecut." Thereafter, effluent at 1/4-hour intervals is sequestered and samples taken from these "cuts" for heat color test. (The test is described herein above). Samples of the molten M.A. feedstock are also taken for comparative purposes. These are designated as "standards." Results of the operation are presented on the table which follows. It is evident that the process treatment has effected a marked improvement in the heat color of the maleic anhydride.

TABLE I.—CONTINUOUS TREATMENT OF MOLTEN REFINED MALEIC ANHYDRIDE BY PASSAGE THROUGH A BED OF $BaCl_2 \cdot 2H_2O$ Bed dimensions: 0.62 inch I.D. x 4 inch long
$BaCl_2 \cdot 2H_2O$ weight: 36.2 g.
M.A. feed rate: 1,330 g./hr.
Residence time: 1.2 min.
Mass velocity: 1,400 lb./hr. ft.$^2$
LHSV: 36.7 hrs.$^{-1}$

| Cut No.[1] | Effluent color,[2] Pt-Co Before heat test | After | Cut No.[1] | Effluent color,[2] Pt-Co Before heat test | After |
|---|---|---|---|---|---|
| 2A | 20 / 20 | 100 / 100 | 3A | 20 / 20 | 70 / 70 |
| 2B | 20 / 20 | 70 / 70 | 3B | 20 / 20 | 80 / 80 |
| 2C | 20 / 20 | 80 / 80 | 3C | 25 / 25 | 70 / 80 |
| 2D | 20 / 20 | 70 / 60 | 3D | 20 / 20 | 50 / 50 |

[1] Number gives run time in hours; letter gives quarter hour composited (thus 3B=third hour, second quarter).
[2] "Standard" gave color of 20 before heat test; 125 after (4 replicates):

Similarly when sodium chloride, barium sulfate, calcium bromide, barium nitrate or silver chloride is used in place of barium chloride in the above example, similar results are obtained.

Similarly when a temperature of 53° C., 100° C., 150° C. or 190° C is used instead of 60° C. as shown above, similar results are obtained.

Similarly when a crystal size of 1 to 3 mm. or 5 to 10 mm. is used in place of 0.3 to 0.5 mm. as above, similar results are obtained.

Similarly when an LHSV of 17.1 or 1.5 hrs.$^{-1}$ is used in place of 36.7 hrs.$^{-1}$ in the above example, similar results are obtained.

Similarly when a maleic anhydride from various commercial sources is used in place of the maleic anhydride in example 1 above similar results are obtained.

It should be noted that the solid treating agents can be employed in the anhydrous form as well as in hydrated forms as illustrated in the foregoing example.

I claim:

1. A method for preparing a color stable maleic anhydride which comprises passing molten maleic anhydride through a bed of solid treating agent selected from the group consisting of alkali and alkali earth chloride, sulfate and bromide, barium nitrate and silver chloride and mixtures thereof.

2. The method of claim 1 wherein the temperature of molten maleic anhydride is between 52° and 190° C, the L.H.S.V. is between 0.1 and 100, and the particle size of the treating agent is between 0.001 and 100 mm.

3. The method of claim 1 wherein the temperature of the molten maleic anhydride is between 60° and 100° C., the LHSV is between 1 and 10 hrs.$^{-1}$ and the particle size of the treating agent is between 0.1 and 10 mm.

4. A method for preparing a color stable maleic anhydride which comprises passing molten maleic anhydride through a bed of barium chloride.

5. The method of claim 4 wherein the temperature of the molten maleic anhydride is between 52° and 190° C., and the L.H.S.V is between 0.1 and 100, and the particle size of barium chloride is between 0.001 and 100 mm.

6. The method of claim 4 wherein the temperature of the molten maleic anhydride is between 60° and 100° C., the L.H.S.V. is between 1 and 10 and the particle size of barium chloride is between 0.1 and 10 mm.

* * * * *